March 4, 1930. G. F. WELLS 1,749,173
ELECTRICALLY HEATED WAFFLE IRON
Filed April 4, 1927 3 Sheets-Sheet 1
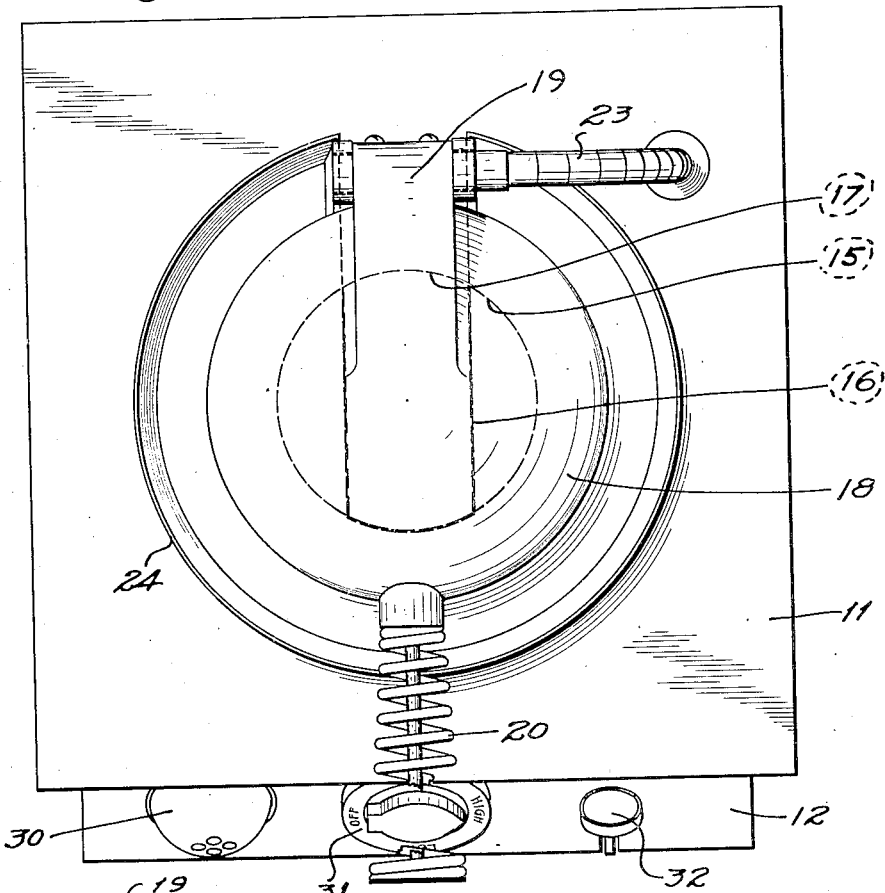
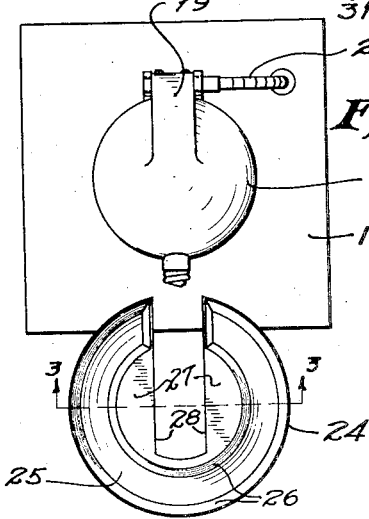
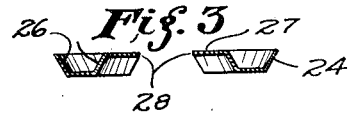
INVENTOR
G. F. WELLS
By John Flam
ATTORNEY March 4, 1930.   G. F. WELLS   1,749,173
ELECTRICALLY HEATED WAFFLE IRON
Filed April 4, 1927   3 Sheets-Sheet 2
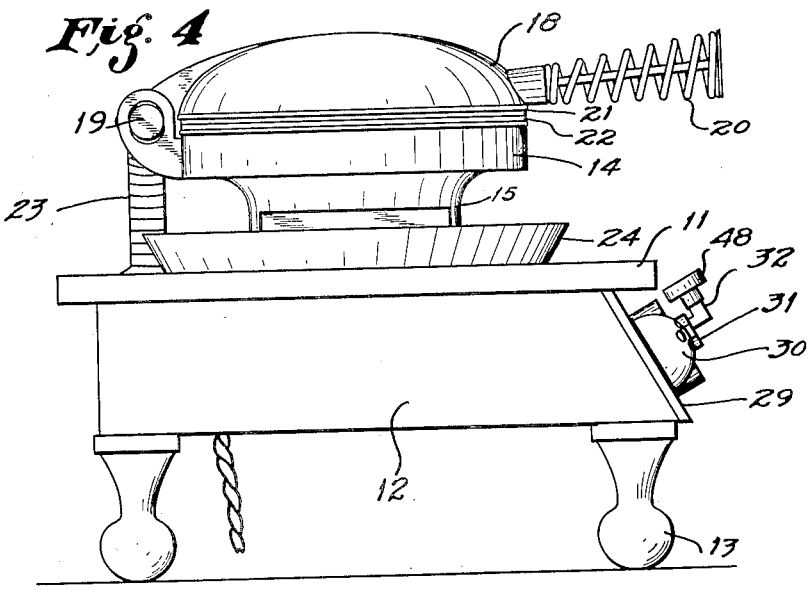
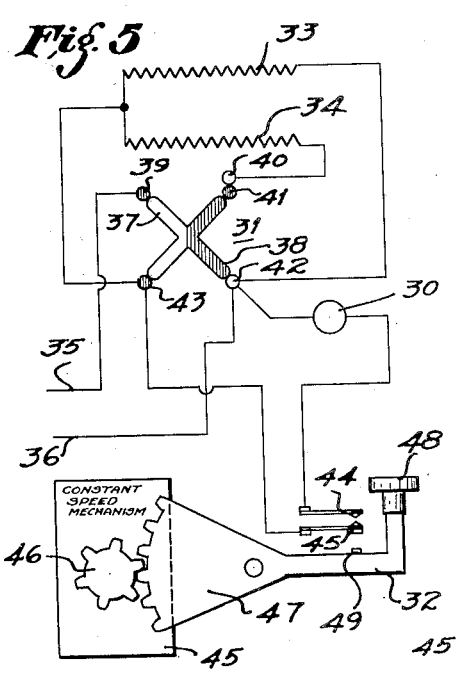
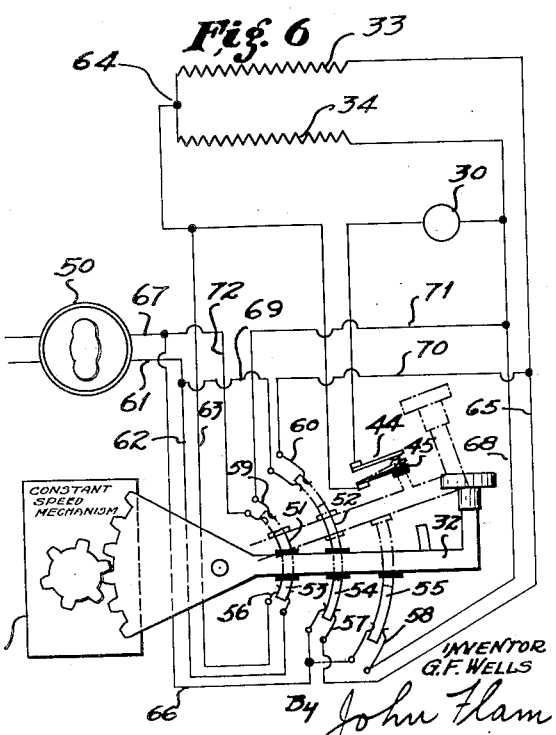

March 4, 1930.                G. F. WELLS                    1,749,173
                    ELECTRICALLY HEATED WAFFLE IRON
                       Filed April 4, 1927           3 Sheets-Sheet 3
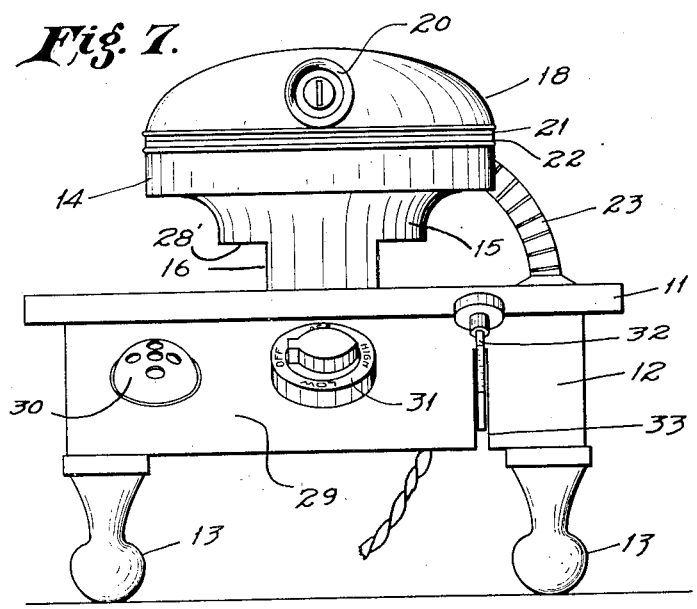
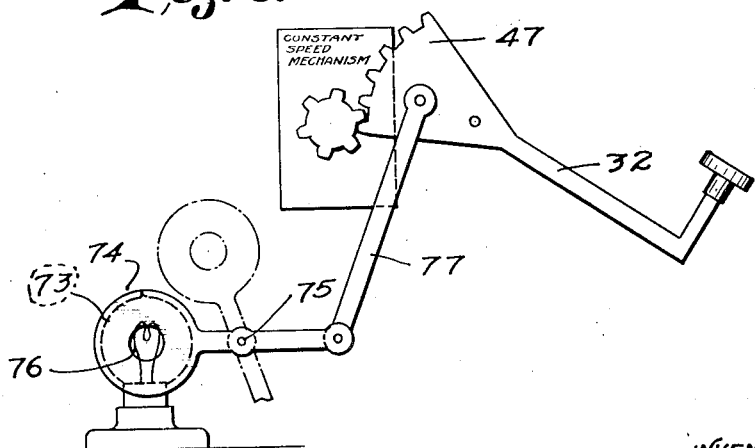
INVENTOR
G. F. WELLS
By John Flam
ATTORNEY Patented Mar. 4, 1930

1,749,173

UNITED STATES PATENT OFFICE

GEORGE FREDERICK WELLS, OF SAN FRANCISCO, CALIFORNIA

ELECTRICALLY-HEATED WAFFLE IRON

Application filed April 4, 1927. Serial No. 180,883.

This invention relates to an electrical cooking device, and especially to an electric waffle iron.

Such waffle irons have a pair of cooperating waffle molds, each individually heated by a heating unit. When using waffle irons in restaurants, it is advantageous to keep the iron at operating temperature at all times, even when no waffles are being baked. This can be accomplished by reducing the energization of the heating elements. Ordinarily, also, a pilot light is used which indicates by its brightness whether the waffle iron has high energization or low energization. Such a waffle iron is described and claimed in my prior Patent No. 1,534,430, issued April 21, 1925.

It is one of the objects of my invention to improve in general the waffle iron shown in that patent.

It is another object of my invention to make it easy to keep the iron clean and in proper condition for use.

My invention possesses many other advantages, and has other objects which may be made more easily apparent from a consideration of several embodiments of my invention. For this purpose I have shown a few forms in the drawings accompanying and forming part of the present specification. I shall now proceed to describe these forms in detail, which illustrate the general principles of my invention; but it is to be understood that this detailed description is not to be taken in a limiting sense, since the scope of my invention is best defined by the appended claims.

Referring to the drawings:

Figure 1 is a top plan view of a waffle iron embodying my invention;

Fig. 2 is a similar view on a smaller scale, showing how the tray can be removed for cleaning purposes;

Fig. 3 is a sectional view of the tray, taken along plane 3—3 of Fig. 2;

Fig. 4 is a side view of the iron shown in Fig. 1;

Figs. 5 and 6 are two alternate forms of heating and timing controls that can be used with the iron shown in the preceeding figures;

Fig. 7 is a front view of the iron with the tray removed; and

Fig. 8 is a diagrammatic view of another alternate form of signal control.

The waffle iron includes a base 11 beneath which there is a compartment 12 that serves efficiently to house the wiring and other apparatus used for controlling the heating units. This compartment in turn is shown as supported on a series of legs 13.

Upon the base 11 a lower mold section 14 is supported. This is shown as round in this instance, and includes a circular central pedestal 15 (Figs. 3 and 7), which is undercut as shown on Fig. 7 so as to leave a central narrow portion 16 having vertical sides, and ends formed by arcs of a circle as indicated by dotted lines 17 in Fig. 1. The upper mold section 18 is shown as hinged to the lower mold section 14 at 19, and is also provided with a coil handle 20 of conventional design. The hinge 19 is hollow, whereby the connections to the waffle mold elements can be made therethrough. The edges of the waffle molds are indicated at 21 and 22, Fig. 4, and since they can be made entirely similar to those disclosed in my prior patent hereinbefore referred to, it is considered unnecessary to describe either the waffle molds or their heating units in any greater detail.

The electrical connections to the molds are provided by a flexible, armored cable 23 which leads from below base 11 and compartment 12 to the hollow hinge 19. Thence the connections extend to each individual heating element, associated with the molds 21 and 22.

One of the features of my invention is the provision of a removable tray 24 which loosely straddles the narrow portion 16 of pedestal 15. This tray is shown most clearly in Figs. 2 and 3. It includes an almost complete annular portion 25 having sloping sides 26, the open part of the ring being used to permit sliding the tray so that it encompasses member 16. A flat flange 27 extends between the inner edges of tray 24, but is cut away as shown at 28 (Fig. 2) so as not to interfere with the member 16. The upper surface of this flange lies close to the undercut shoulder of pedestal 15, which shoulder is shown at 28' in Fig. 7. The tray 24 when in place on base 11 extends substantially entirely around the iron; and it is only under hinge 19 that there is no portion of the tray. Since no dripping of batter takes place at the hinges, this incompleteness is not at all objectionable.

When using the iron, a slight drip of batter as it expands between the molds is almost unavoidable. This drip takes place upon the removable tray 24 which can easily be taken off and cleaned. There is thus no difficulty in keeping the waffle iron free from drippings, which in the ordinary form of iron lends a distinctly disagreeable and soiled appearance to the waffle iron.

The compartment 12 has in this instance a sloping front 29 (Fig. 4) upon which are supported a pilot light 30 with its guard, and a snap switch 31 by the aid of which the electrical elements can be controlled. A lever 32 is also visible, and extends through a slot 33 (Fig. 7) in the front 29. This lever is used for a timing function, by the aid of which the operator is apprised that the waffle is done, and which can affect either the heating elements or the pilot 30, or both.

One form of the timing device is diagrammatically illustrated in Fig. 5. The heating units 33 and 34 are each associated respectively with the upper and lower molds. The electrical energy is supplied from an external source through lines 35 and 36. The snap switch 31 is diagrammatically illustrated, and is so connected that it can deenergize both units 33 and 34, or place them in series across lines 35 and 36, giving low heat, or else place them in parallel, giving high heat. These functions can be accomplished in the same manner as in my prior patent.

Switch 31 has a pair of blades 37 and 38, insulated from each other and disposed at different levels in the switch. Each blade has a pair of contact arms, and blade 38 is shaded to indicate that it is at a different level from that of blade 37. The stationary posts with which the blades are intended to cooperate are designated by circles 39 to 43 inclusive; and those that cooperate with blade 37 are left unshaded, while those that cooperate with blade 38 are shaded. For the position shown, the elements 33 and 34 are deenergized. When the switch blades are rotated 90° in a counter-clockwise direction, the elements are connected in series for low heat. A further 90° rotation places them in parallel, for high heat, and another 90° rotation again deenergizes them. The connections for these conditions have been carefully traced in my prior patent, hence there is no need for further elucidation thereof.

The pilot 30 is not controlled by switch 31, but is controlled by a pair of relatively movable contacts 44 and 45, which when closed, places it across one of the elements, such as 33. Thus when the elements are in series, corresponding to low energization, pilot 30 has impressed across it but half the line voltage and burns dimly; and on the other hand, when the elements are in parallel, pilot 30 has impressed across it the full line voltage and burns brightly. However, contacts 44 and 45 must be closed to complete the circuit.

The pilot light circuit is normally open; it is closed by a timing device which thus causes light 30 to burn and to signal that the waffle is baked. Any appropriate form of timing device can be used; I indicate it in this instance by a rectangle 45 having an external pinion 46 that is arranged to be driven at constant speed by the mechanism. It meshes with segment 47, mechanically connected with lever 32 whereby depression of lever 32 by the fingers acting on button 48 serves to wind up the mechanism. When this lever is released by the fingers, pinion 46 starts to rotate in a clockwise direction, and after a period of time determined by the amount the lever 32 has been depressed, the contacts 45 and 44 are caused to engage each other, as by the aid of a boss 49 carried by the lever 32. It is thus evident that a signal is obtained after a predetermined interval, the pilot 30 being energized when this lever 32 is moved to closing position by pinion 46. Of course audible signals could be used in place of pilot 30, such as a bell or buzzer. The period of time that it takes for the signal to light is determined by the angular travel of lever 32; and this is determined by the amount the lever 32 has been previously depressed. In this way, a timing function can be obtained.

The timing lever 32 can be modified so as automatically to change the degree of energization from high to low when a definite period has elapsed. This is shown in Fig. 6: The lever 32 operates to wind up the mechanism 45 just as in the other form; and this mechanism in turn serves slowly to move the arm 32 in a counterclockwise direction. The elements 33 and 34 are controlled by contacts operated by the movement of the arm 32; and pilot 30 is operated as before by contacts 44 and 45 to close its circuit upon completion of the baking operation.

Since the change in energization is effected automatically by the arm 32, the snap switch 50 is used as a main line switch only, to energize or deenergize the iron, but not to vary the degree of energization. To vary the energization, there are carried by arm 32, a series of blades 51, 52, on its upper side, and 53, 54 and 55 on its lower side. These blades 53, 54 and 55 are arranged to contact with contact fingers 56, 57 and 58 respectively, for substantially the full period of movement upward of arm 32; but they open the circuit at these fingers just before blades 51 and 52 engage fingers 59 and 60 respectively.

When blades 53, 54 and 55 are in contact with fingers 56, 57 and 58, the elements 33 and 34 are in parallel, and the iron is fully heated. The circuit can be traced as follows: from main 61, connection 62, fingers 56 (closed by blade 53), connection 63, to point 64, where the current divides. One portion of the current flows through element 33, lead 65, fingers 57 (closed by blade 54) and lead 66 back to the other main 67. Another portion of the current flows from point 64 through element 34, lead 68, fingers 58 (closed by blade 55), lead 66, back to the other main 67.

These connections are however interrupted after a predetermined time, as heretofore described; and others are established immediately thereafter, by blades 51 and 52. Under such circumstances, pilot light 30 is also energized, and the heating elements 33 and 34 are in series. The circuit can be traced as follows: main 61, connection 69, fingers 60 (closed by blade 52), connection 70, element 33, element 34, lead 71, fingers 59 (closed by blade 51), and lead 72 back to main 67. In this way, the operator does not need to change the connections at all; he simply notes the energization of lamp 30 and knows that the baking period is over.

The signal can be effected in various other ways. For example, in Fig. 8 I illustrate diagrammatically, a variation in which the pilot light 73 which is the equivalent of light 30 in the other figures, is obscured at least partly, until the lever 32 reaches its upper position. This is accomplished by a movable blinder 74 pivoted at 75 and connected mechanically with the timing arrangement. This blinder 74 can have a small aperture 76 in it if desired to let only a very small portion of the light to shine through until segment 47 completes its movement. The mechanical connection between the timer and the blinder is shown in this instance as a link 77; but it is obvious that other forms of connection could as well be used. Furthermore, the figure is diagrammatic; the elements shown would probably be in somewhat different spatial relationship.

I claim:

1. In an electrical waffle iron, a stationary waffle mold, a hinged waffle mold, means for electrically heating both molds, a pedestal upon which the stationary mold is supported, said pedestal being narrow and having straight vertical sides, and a removable tray having a slot in which the pedestal can be accommodated when the tray is in place beneath the stationary mold.

2. In an article of the character described, a body portion open at one side and provided with a central bore, whereby said body may be placed around and removed from the support of a cooking appliance, there being a trough-like recess extending around said body portion into which drippings from said cooking appliance will fall.

3. In a drip pan for cooking utensils such as waffle irons, an annularly shaped body portion adapted to extend around the major portion of the perimeter of the iron, said body being open at one side to facilitate placing the pan around the base of the iron, and a trough in said body portion into which drippings from the iron may fall.

4. In a drip pan for cooking appliances such as waffle irons, a body portion adapted to extend around the major portion of the perimeter of said iron, said body portion having an opening at one side merging into a central bore for the accommodation of the waffle iron support, and a trough in said body portion into which drippings from said iron may fall, one wall of said trough being disposed at an inclination to the axis of said central bore.

5. In a removable tray structure, a body portion open at one side, said body portion having a recess extending around it near its periphery, and a slotted top center plate.

6. A cooking device, a pedestal for the device, said pedestal having straight vertical side portions with an overhanging shoulder, and a removable tray arranged to be passed around the pedestal, said tray having a slotted top plate arranged directly beneath the overhanging shoulder, the slot in the top plate closely embracing the vertical sides.

In testimony whereof I have hereunto set my hand.

GEORGE FREDERICK WELLS.